(12) United States Patent  
Dalsgaard et al.

(10) Patent No.: US 8,803,351 B2  
(45) Date of Patent: Aug. 12, 2014

(54) CONTROL METHOD FOR A WIND TURBINE

(75) Inventors: Søren Dalsgaard, Hadsten (DK); Lars Risager, Ry (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 13/805,239

(22) PCT Filed: Jun. 13, 2011

(86) PCT No.: PCT/DK2011/050211  
§ 371 (c)(1),  
(2), (4) Date: Mar. 11, 2013

(87) PCT Pub. No.: WO2011/157272  
PCT Pub. Date: Dec. 22, 2011

(65) Prior Publication Data  
US 2013/0161955 A1  Jun. 27, 2013

Related U.S. Application Data

(60) Provisional application No. 61/356,187, filed on Jun. 18, 2010.

(30) Foreign Application Priority Data

Jun. 18, 2010 (DK) .................................. 201070273

(51) Int. Cl.  
*F03D 9/00* (2006.01)  
*H02P 9/04* (2006.01)  
*B64C 11/00* (2006.01)  
*B64C 27/00* (2006.01)  
*G05D 3/12* (2006.01)  
*G05D 5/00* (2006.01)

(52) U.S. Cl.  
USPC .................... 290/44; 290/55; 416/1; 700/287

(58) Field of Classification Search  
USPC ............................ 290/44, 55; 416/1; 700/287  
See application file for complete search history.

(56) References Cited

U.S. PATENT DOCUMENTS 3,639,076 A * 2/1972 Rowen ............................ 416/30  
4,160,170 A * 7/1979 Harner et al. .................... 290/44  
(Continued)

FOREIGN PATENT DOCUMENTS

EP  1612414  1/2006  
EP  1988284  11/2008

OTHER PUBLICATIONS

Danish Patent and Trademark Office Search Report dated Jan. 19, 2011 for DK application No. PA 2010 70273.

(Continued)

*Primary Examiner* — Pedro J Cuevas  
(74) *Attorney, Agent, or Firm* — Patterson & Sheridan, LLP

(57) ABSTRACT

The invention relates to a method of controlling a wind turbine having a rotor with pitchable wind turbine blades and a generator for producing power, where a pitch reference value for the wind turbine blades is determined, and an operational parameter representing a loading on the wind turbine rotor exerted by the wind is measured at time intervals. A variation parameter reflecting a variation of the operational parameter over time is determined and used in the determination of a minimum pitch limit value of the pitch reference value. The wind turbine is then controlled according to the pitch reference value only if the pitch reference value is above or equal to the minimum pitch limit value, and otherwise according to the minimum pitch limit value.

The invention further relates to a method of controlling the change in the operational parameter as measured in two successive time steps is determined and the turbine then being controlled according to a safety control strategy if the difference between the operational parameter change and the variation parameter is above a certain alert threshold.

The invention further relates to a control system configured to perform the above control method, and a wind turbine comprising such system.

22 Claims, 8 Drawing Sheets

(56) References Cited

U.S. PATENT DOCUMENTS

| | | | | |
|---|---|---|---|---|
| 4,161,658 A | * | 7/1979 | Patrick | 290/44 |
| 4,193,005 A | * | 3/1980 | Kos et al. | 290/44 |
| 4,339,666 A | * | 7/1982 | Patrick et al. | 290/44 |
| 4,426,192 A | * | 1/1984 | Chertok et al. | 416/1 |
| 4,651,017 A | * | 3/1987 | Longrigg | 290/44 |
| 4,656,362 A | | 4/1987 | Harner et al. | |
| 7,351,033 B2 | * | 4/2008 | McNerney | 416/1 |
| 7,488,155 B2 | * | 2/2009 | Barbu et al. | 416/1 |
| 7,761,190 B2 | * | 7/2010 | Delmerico et al. | 700/297 |
| 7,874,797 B2 | * | 1/2011 | Pierce et al. | 416/1 |
| 7,950,901 B2 | * | 5/2011 | Barbu et al. | 416/1 |
| 7,956,482 B2 | * | 6/2011 | Nies et al. | 290/55 |
| 7,964,979 B2 | * | 6/2011 | Miranda et al. | 290/44 |
| 8,096,762 B2 | * | 1/2012 | Risager et al. | 416/1 |
| 8,123,477 B2 | * | 2/2012 | Risager et al. | 416/1 |
| 8,150,641 B2 | * | 4/2012 | Morjaria et al. | 702/60 |
| 8,154,235 B2 | * | 4/2012 | Kestermann et al. | 318/400.21 |
| 8,178,986 B2 | * | 5/2012 | Vyas et al. | 290/44 |
| 8,239,071 B2 | | 8/2012 | Lausen | 700/287 |
| 8,334,607 B2 | * | 12/2012 | Egedal et al. | 290/44 |
| 8,380,357 B2 | * | 2/2013 | Garcia Barace et al. | 700/287 |
| 2007/0057517 A1 | | 3/2007 | McNerney | |
| 2009/0257873 A1 | * | 10/2009 | Egedal et al. | 416/1 |
| 2009/0295160 A1 | * | 12/2009 | Wittekind et al. | 290/44 |
| 2010/0014971 A1 | * | 1/2010 | Risager et al. | 416/1 |
| 2010/0098540 A1 | | 4/2010 | Fric et al. | |
| 2010/0119369 A1 | * | 5/2010 | Risager et al. | 416/1 |
| 2010/0140941 A1 | * | 6/2010 | Egedal et al. | 290/44 |
| 2010/0286835 A1 | * | 11/2010 | Nyborg et al. | 700/287 |
| 2011/0084485 A1 | * | 4/2011 | Miranda et al. | 290/44 |
| 2011/0123331 A1 | * | 5/2011 | Stiesdal | 416/1 |
| 2011/0181045 A1 | * | 7/2011 | Letas et al. | 290/44 |
| 2011/0301769 A1 | * | 12/2011 | Lovmand et al. | 700/287 |
| 2012/0146331 A1 | * | 6/2012 | Egedal et al. | 290/44 |
| 2013/0035798 A1 | * | 2/2013 | Zhou et al. | 700/287 |
| 2013/0140820 A1 | * | 6/2013 | Tarnowski | 290/44 |
| 2013/0144449 A1 | * | 6/2013 | Dalsgaard et al. | 700/287 |
| 2014/0017081 A1 | * | 1/2014 | Esbensen et al. | 416/1 |

OTHER PUBLICATIONS

PCT International Search Report and Written Opinion dated Feb. 20, 2012 for international application No. PCT/DK2011/050211, 9 pages.

* cited by examiner

CONTROL METHOD FOR A WIND TURBINE

CROSS-REFERENCE TO RELATED APPLICATIONS

This application claims the benefit of International PCT Application No. PCT/DK2011/050211 entitled "Control Method For A Wind Turbine" and filed on Jun. 13, 2011 with benefit to both U.S. Provisional Application Ser. No. 61/356,187 entitled "Control Method For A Wind Turbine" and filed Jun. 18, 2010, and Danish Patent No. PA 2010 70273 entitled "Control Method For A Wind Turbine" or in Danish "Fremgangsmåde til styring of en vindmølle" and filed Jun. 18, 2010.

The present invention relates to a method of controlling a wind turbine having a rotor with pitchable wind turbine blades and a generator for producing power with the aim of increasing the energy production while ensuring that the loading on the wind turbine is kept within acceptable limits.

BACKGROUND

Most modern wind turbines are controlled and regulated continuously most often with the purpose of ensuring maximum power extraction from the wind under the current wind, and weather, while at the same time ensuring that the loads on the different components of the wind turbine are at any time kept within acceptable limits. Desirably, the wind turbine may also be controlled to account for fast sudden increase in the wind velocity—the so-called wind gusts, and take into account the dynamic changes in the loads on the individual blades due to e.g. the passing of the tower or the actual wind velocity varying with the distance to the ground (the wind profile or shear).

To this purpose a number of parameters are collected and monitored by the controllers in a wind turbine, such as for instance the current wind speed and direction, the rotational speed of the rotor, the pitch angle of each blade, the yaw angle, information on the grid system, and measured parameters (e.g. stresses or vibrations) from sensors placed e.g. on the blades, the nacelle, or on the tower.

Based on these and following some control strategy the optimal control parameters of the turbine in order to perform optimally under the given conditions are determined. The current performance, and thereby the power production and the load situation of the wind turbine is primarily controlled by controlling the pitching of the blades, but may further include adjusting for instance any different active aerodynamic devices for changing the aerodynamic surfaces of the blades such as flaps or vortex generating means, adjusting the power, and/or adjusting the rotational speed of the rotor.

Wind turbines are traditionally constructed and controlled according to standards and according to wind maps and incorporating the trade-off of maximizing the annual energy production by the wind turbine while at the same time ensuring a certain life time of the turbine i.e. keeping the loads on the different components of the wind turbine within acceptable limits at all times and over time. Wind turbines are therefore typically designed according to a certain (high) turbulence but will most often be operating at a lower turbulence level and may in some conditions be controlled too conservatively while in some conditions not conservative enough resulting in undesired fatigue or extreme loads on the wind turbine components, especially the blades, nacelle and tower.

SUMMARY OF THE INVENTION

It is therefore an object of embodiments of the present invention to provide a control method for a wind turbine which obviate or reduce some of the above mentioned problems in known controlling methods.

It is a further object of the invention is to provide a control method for increasing the energy production of the wind turbine. A further object of the invention is to provide a control method for ensuring that the loads on the turbine are kept within acceptable limits in all wind conditions.

It is a further object of the invention to provide a control method which in a simple and effective way may react fast and reliable to changes in the wind load conditions.

In accordance with the invention this is obtained by a method of controlling a wind turbine having a rotor with pitchable wind turbine blades and a generator for producing power, the method comprising the steps of:
  determining a pitch reference value for one or more of the wind turbine blades;
  measuring at time intervals at least one operational parameter representing a loading on the wind turbine rotor exerted by the wind,
  determining a variation parameter reflecting a variation of said operational parameter over time,
  determining a minimum pitch limit value of the pitch reference value as a function of said variation parameter,
  controlling the wind turbine according to the pitch reference value only if the pitch reference value is above or equal to the minimum pitch limit value, and
  controlling the wind turbine according to the minimum pitch limit value if the pitch reference value is below the minimum pitch limit value.

The control method according to the invention hence comprises a control strategy for tuning the pitch control so as to ensure that the loading on the wind turbine is kept within acceptable limits by determining at each time step an operational parameter representing a loading on the wind turbine rotor exerted by the wind, and using the variations in time hereof as a basis for deciding the minimum pitch limit value being the minimum pitch allowable under the current wind and load conditions.

The hereby obtained control method is advantageous in acting as a system detecting and reacting on changes or variations in the load conditions in a simple yet effective way, and in such a way that the turbine may be controlled unaffected according to its conventional pitch control strategy (typically with a view to maximizing the energy production of the turbine), unless the current loading and/or change in loading of the wind turbine dictates the controlling to be advantageously modified by pitching the blades according to the minimum pitch thereby reducing the loading on the wind turbine. Hereby both the current loads (in general understood as referring to both fatigue or instrananeous loads) on different wind turbine components such as the tower, the blades, the generator, the gears etc may be maintained low or decreased.

By the operational parameter representing a loading on the wind turbine rotor exerted by the wind is meant that there is a one to one relationship between the operational parameter and the loading on the wind turbine rotor, such that changes in the loading are directly reflected in corresponding changes in the operational parameter.

The pitch reference value may comprise the value or values for each individual wind turbine blade, and/or the value of the collective pitch reference, so that the control method may be performed on each of the individual blade pitch references and/or on the mean (the collective pitch reference) of these.

The step of determining a pitch reference value may be preformed in the same or in different controllers and may be based on input from various sensors such as load sensors on the blades or rotor shaft, accelerometers in the nacelle, anemometers etc. The pitch reference value may in this way be determined by the pitch controller according to other pitch control strategies taking into account for instance the tilt-yaw control of the turbine, the adjustment of the pitch yielding the maximal power output for the given wind speed, individual pitching taking the wind shear and/or the tower into account, pitching to adjust the rotational speed, or to decrease the tower vibrations.

The measuring of the one or more operational parameters representing a loading on the wind turbine may comprise measuring any parameter representing the incoming wind power or the blade load level, such as measuring the stresses or strains on the blades, measuring the deformation of the blades, measuring the acceleration of the rotor, the generator speed, the generator power, the distance between the blade and the tower, and/or the acceleration of the nacelle or the tower.

The angular acceleration of the rotor may be determined by means of sensors measuring the speed of the high speed shaft on the generator side of the gear. The blade loads may be measured by means of strain gauges or optical fibres placed on or in one or more of the wind turbine blades for instance in the root of the blade.

The time intervals at which the operational parameter and its variation are determined may vary according to need and can for instance be determined continuously or at varying interval lengths dependent for instance on the turbulence conditions, on the current wind direction, on the ambient temperature etc.

The operational parameter may in a first step be filtered by e.g. a high pass filter in order to derive the high frequency content of the operational parameter such as e.g. the blade loads. The high frequency content of the operational parameter has the advantage that they are nearly only turbulence driven, i.e. the dependency of the actual control setting of the wind turbine is limited.

The variation parameter reflecting a variation of the operational parameter may be determined as e.g. the standard deviation and/or the variance of the parameter, may be determined from a rain flow count algorithm, by filtering the operational parameter, or by similar data processing measures reflecting the fluctuation of the parameter over time. Different types of filters may be employed such as fast and slow low pass filters, $1^{st}$ or higher orders filters, a Kalman filter or by the application of Fast Fourier transformation.

As the operational parameter represents a loading of the wind turbine, the variation parameter may represent the fatigue load or the damage rate on the wind turbine.

In case the operational parameter comprises a measure of the loads in the blade root, the variation parameter may represent the fatigue load in the blade root.

In case the operational parameter comprises the acceleration of the rotor, the variation parameter may represent the rotor acceleration power expressing the necessary power used/generated by the rotor inertia to accelerate/decelerate as measured.

Such variation parameter expressing the time wise variation of the operational parameter may be realised in existing control systems by simple means optionally by upgrading of existing systems and without the need for additional measurements.

According to the invention, the variation parameter (e.g. the rotor acceleration power and blade load fluctuations) is used to determine the minimum pitch limit value of the pitch reference which sets a minimum value for the blade pitch, and which is applied in the pitch control overruling the otherwise determined pitch reference value if this is not larger than or equal to the determined minimum pitch limit value.

Hereby is obtained that the pitch controlling is tuned according to the prevailing wind conditions.

The proposed control method does not change the pitch reference of the blades directly but rather indirectly by the setting of a minimum pitch limit, thereby yielding a less conservative control method. The wind turbine may in this way in some situations of benign weather conditions where the traditional control has otherwise proven too conservative increase the power production.

A further advantage of the proposed method is that the tuning or adjusting of the pitch is only activated when needed—generally at high turbulence thereby avoiding peak loads on especially the blades and the tower. Further, in these situations when the modified control strategy is activated, the wind turbine is not simply stopped or de-rated but instead controlled in a manner to reduce the fatigue and damage on the rotor while maintaining a power production of the wind turbine.

A further advantage of the control method according to the invention is that the minimum pitch limit value is dynamic and is repeatingly modified or updated both under low and under high turbulence, thereby in some situations allowing an increased power production and in other situations actively limiting the pitch.

Further, the underlying pitch control may not need to apply as conservative safety factors in determining the pitch reference value, as the setting of the minimum pitch limit value according to the proposed control method may ensure that the controller reacts to potential critical wind and load conditions before they evolve and become critical.

Similarly, the proposed control method is advantageous in reducing the risk of exceeding the design loads of the wind turbine, because the controller is more conservative in load situations which are outside what the turbine has been designed for.

Further, the control method according to the invention is advantageous in taking into account the derivatives and the second order effects of the loads on the wind turbine rotor and therefore accounts for situations where the turbulence is high but where the mean thrust may be acceptable anyhow.

It is an advantage of the method of the present invention that it can be readily applied to existing wind turbines without the requirement of additional components or hardware equipment.

In addition to the controlling of the blade pitch, other controllable parameters of the turbine may be controlled simultaneously or in parallel such as e.g. the yaw or coning of the rotor, the rotational speed of the rotor, the power, the torque, the generator speed, or some adjusting parameters for any different active aerodynamic devices for changing the aerodynamic surfaces of the blades such as flaps or vortex generating means.

According to an embodiment of the invention, the minimum pitch limit value is determined such as to reflect the minimum pitch for maintaining the thrust on the rotor at a maximum allowable thrust level. The thrust expresses the axial force on the wind turbine rotor from the wind and transferred from the rotor blades and the rotor to the nacelle and directed along the axis of rotation of the rotor. The thrust may be positive or negative at different times during the operation of the wind turbine and may be determined as a function of the wind speed, the pitch angle of the rotor blades, and the rotor (or generator) rotational speed.

The proposed control method may thus allow higher maximum rotor thrust when the wind conditions are benign (e.g.

low turbulence) thereby allowing the turbine to generate a higher energy production, while on the same time decreasing the maximum allowable thrust in harsh wind conditions in order to decrease the loading on the turbine.

According to the invention, the control method further comprises the step of determining a power produced by the rotation of the rotor and a rotational speed of the rotor, and determining the minimum pitch limit value of the pitch reference value as a function of said power and said rotational speed of the rotor. As it can be shown that the pitch angle for a given thrust value and a given rotor rotational speed is a linear function of the rotor power, the minimum pitch limit value of the pitch reference value may be determined from these relationship and as a function of the variation parameter either directly or indirectly by first determining the thrust value as the maximum allowable thrust level from the variation parameters. The minimum pitch limit value may hence be determined readily and fast for instance from a set of predetermined curves or equations yielding the above mentioned relationship between the minimum pitch and the rotor power for different rotor rotational speeds and thrust levels.

In a further embodiment of the invention, the method further comprises the step of determining a maximum allowable thrust on the rotor as a function of the variation parameter, and determining the minimum pitch limit value of the pitch reference value as a function of the maximum allowable thrust. As mentioned above, the minimum pitch limit value of the pitch reference value may hereby be obtained from a set of predetermined curves or look-up tables, as the empirical relationship between the minimum pitch and the variation parameter optionally by means of the maximum allowable thrust may be determined beforehand.

In an embodiment of the invention, the minimum pitch limit value of the pitch reference value may be estimated to generally increase for increasing maximum allowable rotor thrust and for increasing rotor or generator power and for increasing rotational speed of the rotor. The minimum pitch limit may be estimated to depend linearly or piecewise linearly on the maximum allowable rotor thrust, the rotor or generator power, and/or the rotor rotational speed.

In a further embodiment of the invention, the method further comprises the step of determining a mean wind speed on the rotor, and determining the maximum allowable thrust as a function of the mean wind speed. The maximum allowable thrust may be based on sets of thrust curves or data sets and as a function of the mean wind speed and the variation parameter. These curves or data sets may be determined off-line from the linkage between the estimated fatigue load, the wind speed and the maximum allowable thrust, and may be obtained e.g. from numerical simulations. The curves or data sets may be established during the design and construction of the wind turbine such as to yield the desired power production by the wind turbine and over the desired life time. The curves or data sets may optionally be updated during operation of the wind turbine. The wind speed used may be a measured or an estimated wind speed and may be a mean wind speed for instance determined as the average wind speed over the rotor area or as the average between a maximum and a minimum wind speed.

Alternatively or additionally the maximum allowable thrust may be determined from predetermined look-up tables yielding an effective and fast method for establishing or estimating the maximum allowable thrust.

In an embodiment of the invention, the maximum allowable rotor thrust may be estimated to generally decrease for increasing variation of the operational parameter and for decreasing wind speeds. The maximum allowable rotor thrust may be estimated to depend linearly or piecewise linearly on the variation of the operational parameter and/or the wind speed. In a more simple estimation of the maximum allowable rotor thrust, the variation of the operational parameter may be estimated to be independent of the wind speed, such that the maximum allowable rotor thrust may be estimated as a function of the variation of the operational parameter only.

In an embodiment of the invention, the step of measuring the operational parameter comprises measuring a sideways, axial, and/or angular acceleration of the rotor, measuring a distance between a wind turbine blade and the wind turbine tower, an acceleration of the tower or the nacelle, and/or a rotational speed of the generator or rotor. These examples of operational parameters all provide a measure which may be obtained relatively easy and exact without the need for any advanced measuring equipment and which provides a simple yet direct measure reflecting the loading on the wind turbine as exerted by the wind and which may therefore be advantageous in determining a fatigue or damage rate of the wind turbine and thereby a maximum allowable thrust limit.

In an embodiment of the invention, the variation parameter is determined as the standard deviation of the operational parameter and/or by filtering the operational parameter. Hereby is obtained a variation parameter expressing the time wise variation of the operational parameter which may be realised in existing control systems by simple means optionally by upgrading of existing systems and without the need for additional measurements.

In a further embodiment of the invention the variation parameter is determined as a function of the difference between a fast and a slow low pass filtered operational parameter, hereby by a simple algorithm obtaining an effective measure for the time dependent variation of the operational parameter in question. The variation parameter in this way reflects a sudden or abrupt change of the operational parameter.

In an embodiment of the invention, the control method may further comprise the steps of determining the change in the operational parameter as measured in two successive time steps, and overruling the preceding control and controlling the wind turbine according to a safety control strategy if the difference between the operational parameter change and the variation parameter is above an alert threshold.

In addition to the relatively slowly adaptive algorithm as previously described which relatively slowly adjust the maximum rotor thrust according to the prevailing stationary or near stationary wind conditions, is hereby is obtained a fast reacting algorithm which will fast modify the control strategy according to a safety strategy in case the loads and thereby the wind conditions are detected as not stationary. By the proposed method, the control algorithm examines whether the operational parameter behaves as expected based on the information from the already derived variation parameter and reacts instantly if the operational parameters deviates too much from its expected value. Such deviation is then taken as a sign of a sudden change in the wind conditions and a precautionary action is taken by applying the safety strategy immediately. By such fast reaction the wind turbine control may be modified so quickly that any high loads especially on the tower or the turbine blades may be avoided, and that the wind turbine need not be shut down but instead may continue to be in an operating and power producing mode.

The safety control strategy may according to embodiments of the invention comprise increasing the minimum pitch limit value, and/or setting the maximum allowable thrust to a predefined value. The safety control strategy hereby by simple means sets a more conservative control (pitch) which may be effectuated fast thereby only affecting the power production minimally while still avoiding any extreme load situations.

In an embodiment of the invention the alert threshold is a predefined constant. The alert threshold may alternatively depend on the most recent minimum pitch limit value, and/or may optionally be a function of the wind speed. The alert threshold may further optionally be a function of other parameters such as e.g. a turbulence factor, acceleration measurements on the nacelle or the blades, the blade loads, the power production, the generator speed, or the current pitch of the blades, whereby is obtained that the control method in some situations reacts more promptly to large variations in the wind load conditions. In this way a control method where a safety control strategy is more likely to occur could be applied in situations where the consequences of the large changes in wind conditions are more severe, for instance at higher wind speeds.

The present invention relates in another aspect to a method of controlling a wind turbine having a rotor with pitchable wind turbine blades and a generator for producing power, the method comprising the steps of:
  determining a pitch reference value of one or more of the wind turbine blades;
  measuring at time intervals at least one operational parameter representing a loading on the wind turbine rotor exerted by the wind,
  determining the change in the operational parameter as measured in two successive time steps,
  determining a variation parameter reflecting a variation of said operational parameter over time,
  controlling the wind turbine according to the pitch reference value only if the difference between the operational parameter change and the variation parameter is below or equal to an alert threshold, and
  controlling the wind turbine according to a safety control strategy if the difference between the operational parameter change and the variation parameter is above the alert threshold.

The advantages of the hereby proposed control method are as given above. In addition thereto, the proposed method in this way provides a method taking fast or sudden changes in the measured operational parameters into account from a comparison to the variation of the operational parameter over a longer time. The control method according to the invention hence comprises a supervision strategy capable of rapidly reacting to sudden too abrupt changes in the load conditions and thereby avoiding severe or extreme load situations on the wind turbine.

The control method according to the invention is further advantageous in leaving the wind turbine control unaffected during benign operation, whereby the benign operation mode is left undisturbed and the power produced by the wind turbine is not unnecessarily reduced in stationary and non-critical wind load conditions.

In an embodiment of the invention the safety control strategy of the above control method comprises increasing the pitch reference value and/or de-rating the wind turbine whereby any undesirable large loads otherwise potentially resulting from the suddenly changing wind load conditions are effectively and in a simple way avoided and prevented. A de-rating control strategy may e.g. include a reduction of the power reference, a reduction of the rotational speed, collective blade pitching out of the wind (optionally combined with individual pitching of the blades) or a combination of two or three of these control schemes.

Alternatively the safety control strategy may comprise stopping the wind turbine which may be achieved e.g. gradually or step wise slowing the turbine down to a halt, or by pitching the blades completely out of the wind.

The present invention relates in another aspect to a method of controlling a wind turbine having a rotor with pitchable wind turbine blades and a generator for producing power, the method comprising the steps of:
  determining a pitch reference value for one or more of the wind turbine blades;
  measuring at time intervals at least one operational parameter representing a loading on the wind turbine rotor exerted by the wind,
  determining the change in the operational parameter as measured in two successive time steps,
  determining a variation parameter reflecting a variation of the operational parameter over time,
  determining a minimum pitch limit value of the pitch reference value as a function of the variation parameter,
  controlling the wind turbine according to a safety control strategy if the difference between the operational parameter change and the variation parameter is above or equal to an alert threshold.
  controlling the wind turbine according to the pitch reference value only if the difference between the operational parameter change and the variation parameter is below the alert threshold and the pitch reference value is above or equal to the minimum pitch limit value, and
  controlling the wind turbine according to the minimum pitch limit value if the difference between the operational parameter change and the variation parameter is below the alert threshold and the pitch reference value is below the minimum pitch limit value.

The hereby proposed control method expresses the combination of a slow reacting control algorithm based primarily on the variation parameter and a fast reacting control algorithm based on a comparison of the step-by-step change of the operational parameter relative to the variation parameter. The advantages of the hereby proposed control method are as given above.

According to another aspect, the present invention relates to a control system for a wind turbine configured to perform the steps of:
  determining a pitch reference value for one or more of the wind turbine blades,
  determining at least one operational parameter measured at time intervals and representing a loading on the wind turbine rotor exerted by the wind,
  determining a variation parameter reflecting a variation of said operational parameter over time,
  determining a minimum pitch limit value of the pitch reference value as a function of said variation parameter,
  controlling the wind turbine according to the pitch reference value only if the pitch reference value is above or equal to the minimum pitch limit value, and
  controlling the wind turbine according to the minimum pitch limit value if the pitch reference value is below the minimum pitch limit value.

Hereby is obtained a control system for a wind turbine capable of being controlled according to the previous control methods and with the advantages derived there from and as described in relation thereto.

Finally, the present invention relates in another aspect to a wind turbine having a rotor with pitchable wind turbine blades and a generator for producing power and comprising a measuring unit placed in relation to the rotor such as to measure at time intervals at least one operational parameter representing a loading on the wind turbine rotor exerted by the wind, the wind turbine further comprising a control system according to the above comprising a pitch controller for determining a pitch reference value for one or more of the wind turbine blades, a processor for determining said at least one operational parameter as measured by the measuring unit, and for determining a variation parameter reflecting a variation of said operational parameter over time, and for determining a minimum pitch limit value of the pitch reference value as a function of said variation parameter, and where the pitch controller is further configured for controlling the wind turbine according to the pitch reference value only if the pitch reference value is above or equal to the minimum pitch limit value, and according to the minimum pitch limit value if the pitch reference value is below the minimum pitch limit value.

The advantages of such wind turbine are as given above in relation to the proposed control methods.

BRIEF DESCRIPTION OF THE DRAWINGS

In the following different examples of the invention will be described with reference to the drawings, wherein.

DETAILED DESCRIPTION OF THE DRAWINGS

Figure 1:
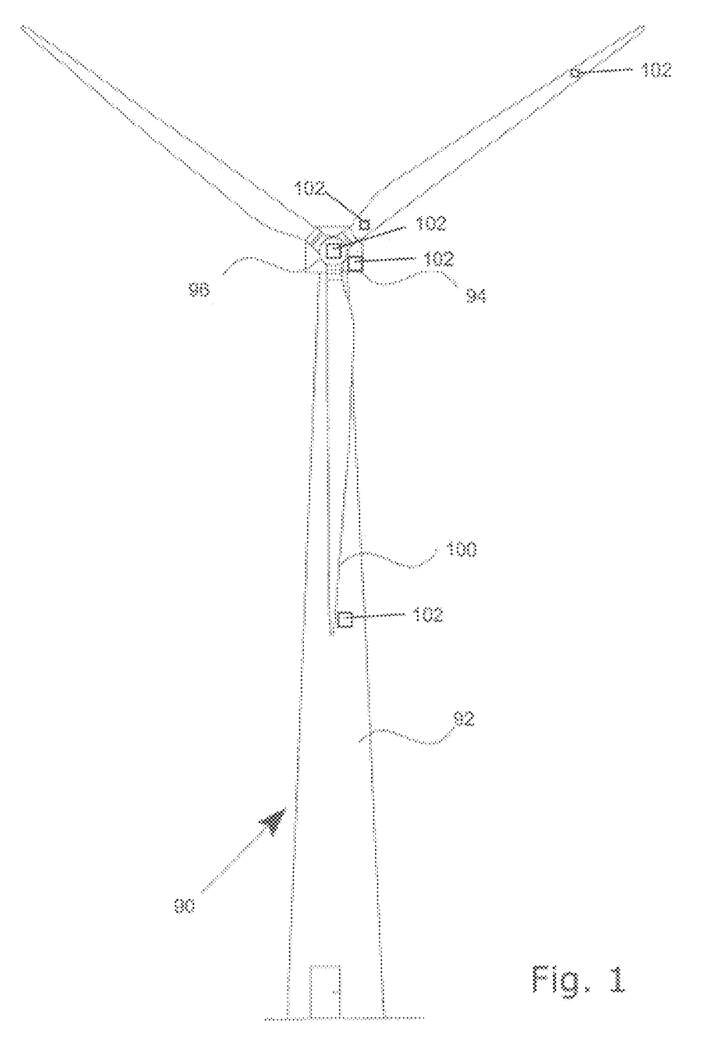
FIG. 1 generally illustrates a wind turbine.

As shown in FIG. 1, a wind turbine 90 comprises a tower 92, a nacelle 94 at the tower top, the nacelle housing machine components, such as gearbox, generator etc. (not shown). At one end of the nacelle, a hub section 96 supports a plurality of wind turbine blades 100. The rotor of the wind turbine includes the blades and possibly other rotating parts. One or more measuring units 102 may be provided with the hub section 96, in or on the nacelle, in one or more of the blades 100, and in the tower 92. The measuring unit(s) 102 is/are arranged to measure one or more operational parameters representing a loading on the wind turbine rotor exerted by the wind, such as an acceleration of a component of the wind turbine, a load of a component of the wind turbine, a deflection of a component of the wind turbine, or a rotational speed of a component of the wind turbine. The load measurement may e.g. be a torque measurement at the hub or a stress in the blade root and carried out by suitable means, such as strain gauges, optical fibres etc. The acceleration measurement may be performed by means of an accelerometer arranged within the hub section, on the nacelle, or on the main shaft. The deflection measurement may be performed e.g. by an angle measurement device. The rpm measurement may conveniently be a performed on the main shaft of the turbine or on a rotatable part within the hub section, to measure the rotational speed of the rotor. Alternatively, it may be performed by an instrument, which is independent of access to the main shaft of the wind turbine.

Figure 2:
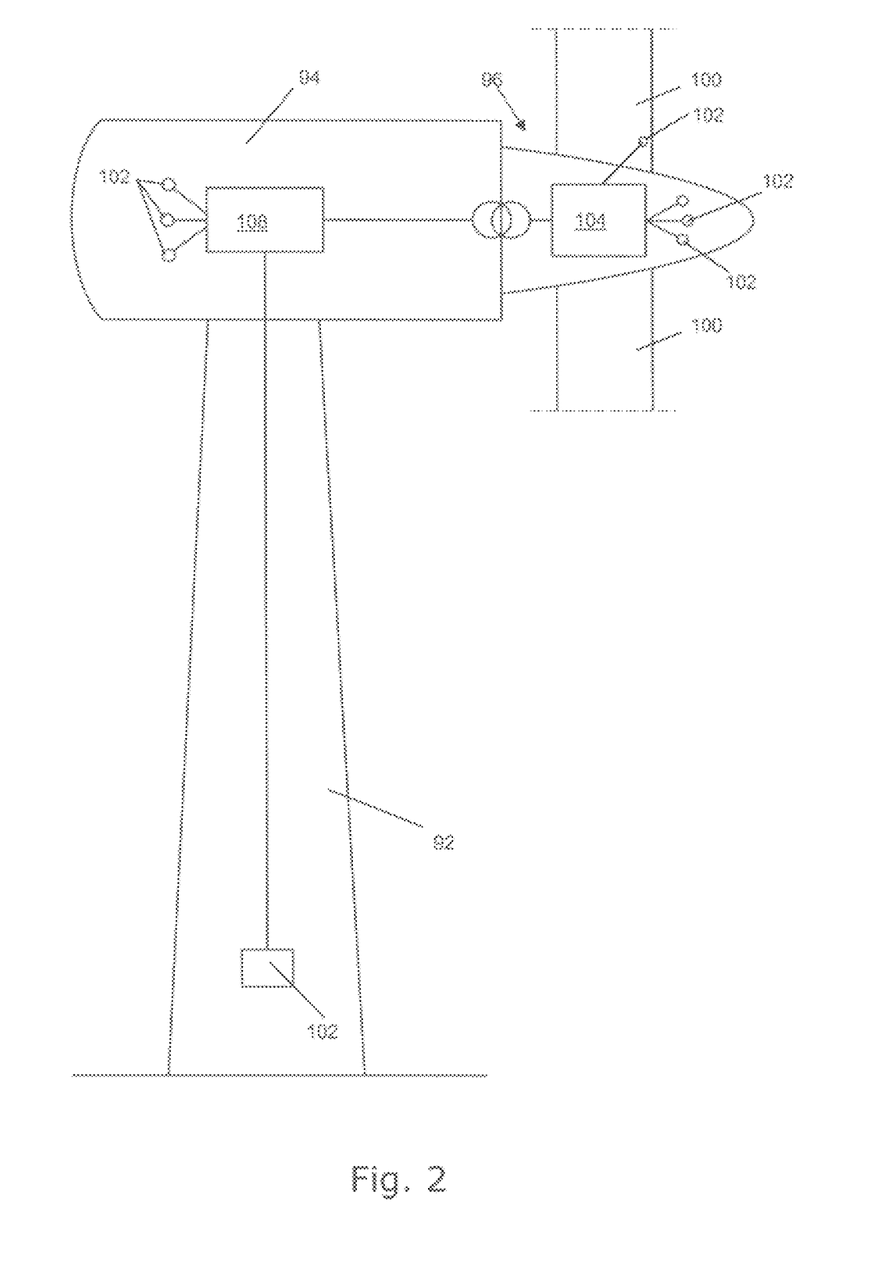
FIG. 2 illustrates a general control system of a wind turbine according to the present invention.

FIG. 2 generally illustrates a control system of an embodiment of a wind turbine according to the invention. The wind turbine comprises one or more controllers such as a nacelle-housed controller 108 within the nacelle 94 and a hub-sided controller 104 and in communication with each other via an interface between the stationary and the rotating parts. The controllers 104, 108 receive inputs from the set of sensors or measuring units 102 placed in different parts of the wind turbine such as in the nacelle, in the blades or the tower. The measuring units 102 may provide input data to the nacelle-housed controller 108 related to e.g. power output of the wind turbine, wind direction, wind velocity and/or other parameters. The hub-sited control circuitry 104 receives input data from a plurality of measuring units 102 arranged to measure e.g. loads on the blades 100 (i.e. blade bending), blade oscillation, rpm, acceleration, velocity or load on the tower 92 and/or other parameters. The sensors 102 may be provided for individual purposes, or some of them may replicate others. For example, two of the sensors 102 may be provided for measuring blade load, whereby one of the sensors 102 is provided to take over if the other fails. The control system comprises a pitch controller for determining the pitch reference value for controlling the pitch of the blades 100. The input from the measuring units 102 is processed in a processor in one or more of the controllers to yield the operational parameter and the variation parameter and thereby determine a minimum pitch limit value which is communicated to the pitch controller. The pitch controller is then configured to control the pitch of the turbine blades according to the pitch reference if this is on the safe side of (i.e. larger than) the determined minimum pitch limit.

Figure 3:
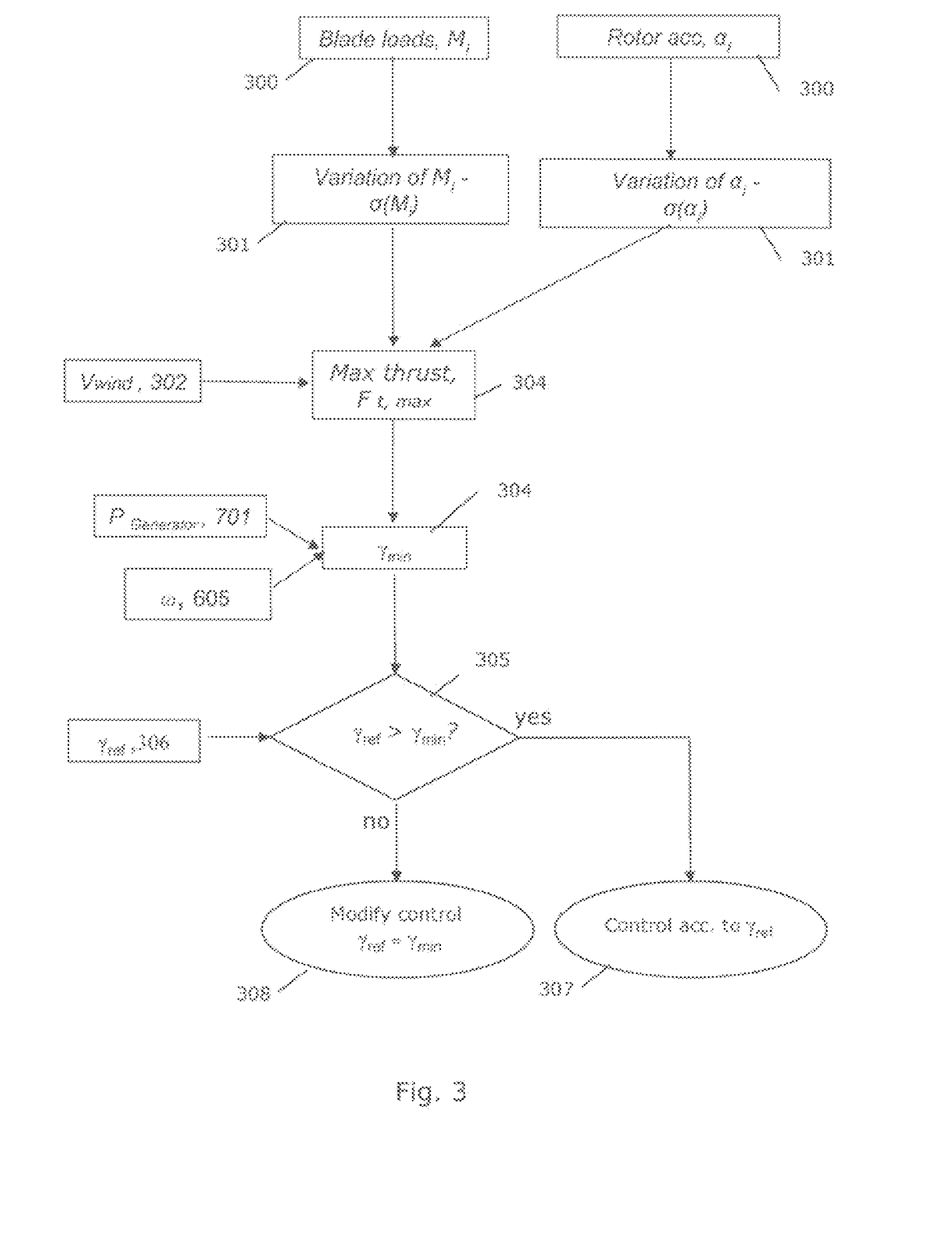
FIG. 3 is a flow-chart illustrating an embodiment of the control method.

FIG. 3 is a flow-chart illustrating an embodiment of the control method according to the invention. One or more operational parameters 300 are measured by different measuring units 102 at time intervals or continuously. The operational parameter 300 represents a loading on the wind turbine rotor caused by the impeding wind and may for instance comprise loads on the turbine blades, $M_i$, and/or the angular acceleration of the rotor $\alpha_i$ as measured at the time step i. The loads on the turbine blades $M_i$ may e.g. be measured by sensors such as strain gauges or optical fibers placed in a blade root or radially further out on the turbine blade. The rotor acceleration $\alpha_i$ may be measured e.g. by means of sensors measuring the speed of the high speed shaft on the generator side of the gearbox.

From the operational parameter the damage or fatigue load in step 301. The signal from step 300 may be filtered by a high pass filter in order to derive the high frequency content of the load input signal. The high frequency content of the signal has the advantage of being nearly only turbulence driven, i.e. the dependency of the actual control settings of the wind turbine is limited. Based hereon a variation parameter $\sigma$, 301 of the operational parameter is determined. The variation parameter $\sigma$ may for instance be the standard deviation or the variance of the operational parameter, or may be determined by applying a rain flow count algorithm or a filtering algorithm.

If the load signal comprises the turbine blade loads $M_i$, the variation parameter over time represents the fatigue or damage rate of the turbine blades which for instance may be determined from a rain flow count.

Figure 4:
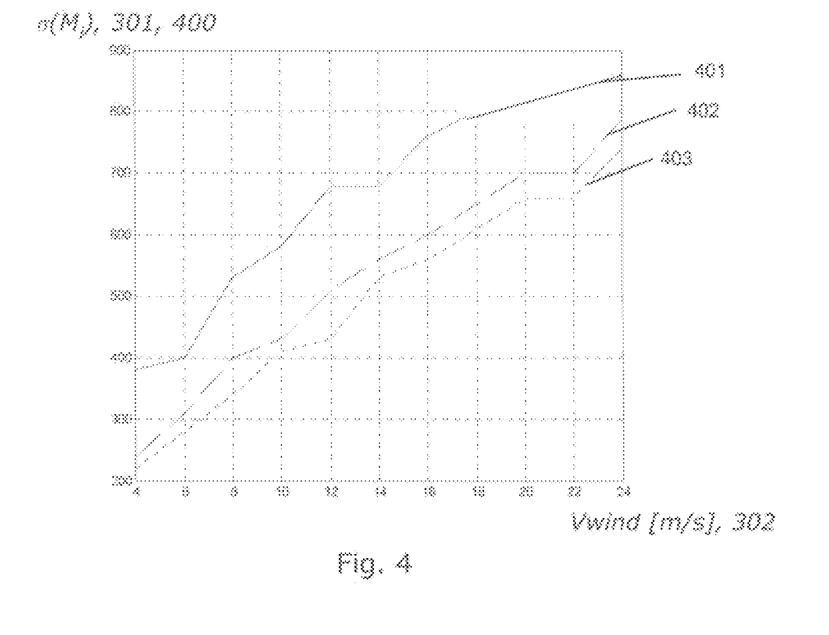
FIG. 4 illustrates the blade load standard deviation $\sigma(M_i)$ as a function of the mean wind speed $V_{wind}$ for three different values of rotor thrust $F_{t,max}$.
Figure 5:
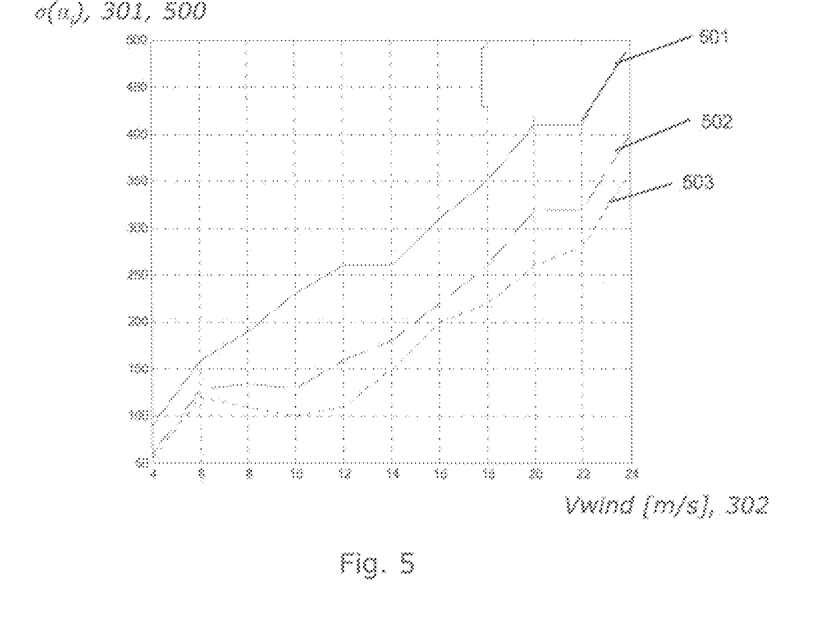
FIG. 5 illustrates the rotor acceleration power $\sigma(\alpha_i)$ as a function of the mean wind speed $V_{wind}$ for three different values of rotor thrust $F_{t,max}$.

In case the load signal comprises the rotor acceleration $\alpha_i$, the variation parameter over time represents the rotor acceleration power expressing the necessary power used or generated by the rotor inertia to accelerate or decelerate as measured. For rotation about a fixed axis, the relationship between the angular momentum L and the moment of inertia I and the angular velocity $\omega$ of the rotor may be expressed as $L = I\omega,$ From this follows that the net torque which determines the rate of change of the angular momentum may be determined as $$\tau_{net} = \frac{dL}{dt} = \frac{d(I\omega)}{dt} = I\frac{d\omega}{dt} = I\alpha,$$

where $\alpha$ is the angular acceleration of the rotor, measured in rad s$^{-2}$. Power is the work per unit time, given by the power P and the torque T as $P = T \cdot \omega$, whereby one arrives at the following expression for the rotor acceleration power P $P = I * d\omega/dt * \omega$ Based on the variation parameter and the current measured or estimated wind speed $V_{wind}$, the maximum rotor thrust $F_{t,max}$ is determined, 303. The maximum rotor thrust $F_{t,max}$, 303 expresses the maximum rotor thrust allowable or acceptable under the given wind conditions in order not to cause too high wear and fatigue on the wind turbine thereby reducing its life time while at the same time obtaining the desired power production over time. The wind speed $V_{wind}$, 302 may be obtained by wind speed measurements from an anemometer or from a wind speed estimation algorithm. The maximum allowable rotor thrust $F_{t,max}$ may be determined from look-up tables or curves which have been predetermined e.g. during the designing of the wind turbine from simulations. Examples of such data material are shown in the FIGS. 4 and 5.

FIG. 4 illustrates the standard deviation of the turbine blade loads $\sigma(M_i)$, 301, 400 as a function of the mean wind speed $V_{wind}$, 302 and for three different values of maximum rotor thrust $F_{t,max}$, 303. In general the variation parameter of the blade loads is increasing by increasing wind speeds. The solid line 401 represents the lowest value of the maximum rotor thrust $F_{t,max}$, 303 of the three ISO curves depicted here, whereas the small dashed line 403 yields the largest value of the maximum rotor thrust $F_{t,max}$. For a given wind speed, the maximum acceptable and allowable rotor thrust therefore in general decreases by increasing turbine blade fatigue. Similarly, for a given level of fatigue $\sigma(M_i)$, an increasing maximum rotor thrust may be accepted for an increasing wind speed.

Similar to FIG. 4, FIG. 5 illustrates the relationship between the standard deviation of the rotor acceleration (yielding the rotor power acceleration) $\sigma(\alpha_i)$, 301, 500 as a function of the mean wind speed $V_{wind}$ 302 and for three different values of maximum rotor thrust $F_{t,max}$, 303, with the thrust decreasing as the line goes from small dashed 503, to dashed 502, to solid 501. As for the turbine blade fatigue, the maximum acceptable and allowable rotor thrust in general decreases by increasing rotor acceleration power for a given wind speed.

In one embodiment of the invention, the maximum allowable rotor thrust may be estimated to depend linearly or piecewise linearly on the variation of the operational parameter and the wind speed. Alternatively, the maximum allowable rotor thrust may be estimated generally to decrease by some predefined function by increasing variations of the operational parameter and by decreasing wind speeds.

In a simple estimation of the maximum allowable rotor thrust, the variation of the operational parameter may be estimated to be independent of the wind speed, such that the maximum allowable rotor thrust may be estimated as a function of the variation of the operational parameter only.

The estimation of the maximum allowable rotor thrust $F_{t,max}$ may be based on the variation of just one operational parameter such as on the turbine blade fatigue or on the rotor acceleration power. Alternatively, the maximum allowable rotor thrust $F_{t,max}$ may be estimated as a function of more variation parameters or may be based on the variation parameter yielding the most conservative estimate for the allowable maximum rotor thrust.

Figure 6:
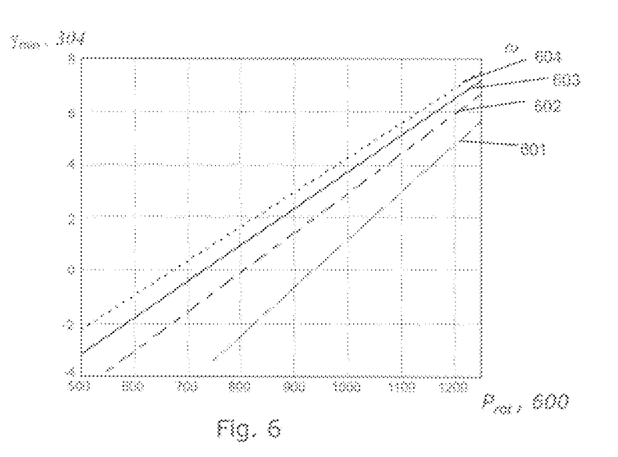
FIG. 6 shows the minimum acceptable pitch angle $\gamma_{min}$ as a function of the rotor power $P_{rotor}$ at four different rotational speed • and for a given constant maximal thrust.

Referring back to FIG. 3, a minimum pitch limit $\gamma_{min}$ 304 is then estimated from the maximum allowable rotor thrust $F_{t,max}$. In general, the thrust decreases with an increasing pitch angle of the turbine blades. Further, it can be shown that the minimum pitch limit $\gamma_{min}$ for a given thrust value may be expressed as a linear function of the rotor power P, 600 as illustrated in FIG. 6. Here, the minimum pitch 304 corresponding to a certain fixed maximum allowable thrust is shown as a function of the rotor power $P_{rotor}$, 600 and for 4 different values of rotational speed of the rotor $\omega$, 601, 602, 603, 604. The rotor rotational speed increases for increasing pitch at a given rotor power. Such relationship may be determined for different values of rotor thrust $F_{t,max}$, 303 from which a minimum pitch limit $\gamma_{min}$ 304 may then be determined based on information of the generator power $P_{generator}$, 701 and the rotational velocity of the rotor $\omega$, 605 by interpolation. The rotor power may be determined from data on the generator power and the rotor rotational speed.

Figure 7:
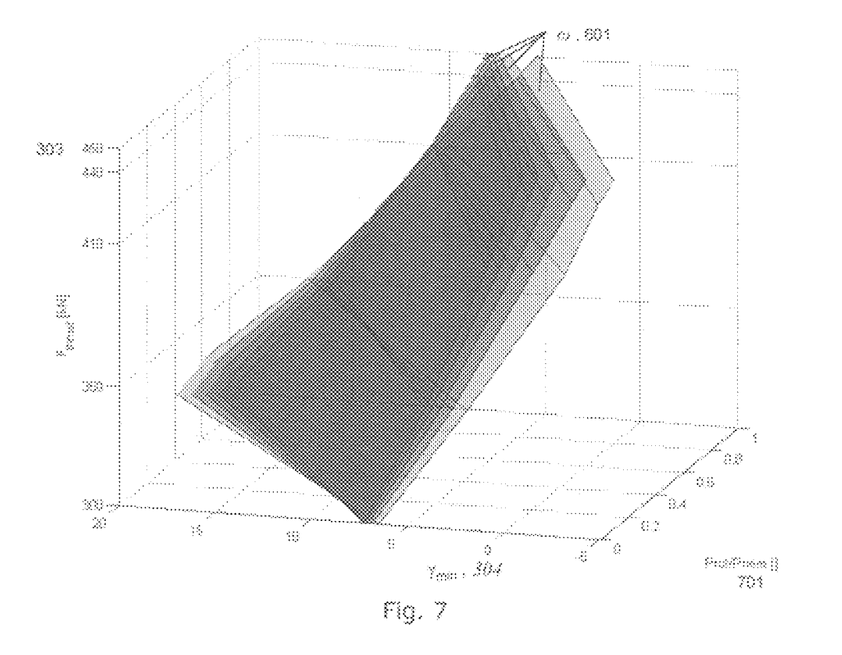
FIG. 7 illustrates the maximum allowable rotor thrust $F_{t,max}$ as a function of the minimum pitch limit $\gamma_{min}$ and the normalized generator power, and for a set of different rotational velocities of the rotor $\omega$.

FIG. 7 illustrates in a 3-dimensional plot the relationship between the maximum allowable rotor thrust $F_{t,max}$, 303, the corresponding minimum pitch limit $\gamma_{min}$ 304 and the generator power $P_{generator}$, 701 (normalized to the nominal power), and for different values of rotational velocity of the rotor $\omega$, 605. As can be seen from the figure, the minimum pitch limit value of the pitch reference value may be estimated to depend linearly or piecewise linearly on the maximum allowable rotor thrust, the rotor or generator power, and/or the rotor rotational speed.

In the step 305 of the control method as outlined in FIG. 3, the minimum pitch limit $\gamma_{min}$ is then compared to the value(s) for the pitch reference $\gamma_{ref}$, 306 as normally determined by the pitch controller. In the case where the already determined pitch reference is on the safe side of the minimum pitch limit $\gamma_{min}$, and the rotor thrust therefore is expected to be lower than the maximum allowable rotor thrust, the pitch reference is left unchanged and the pitch is controlled without taking any extra precautionary action, 307. However, if the pitch reference is lower than the determined minimum pitch limit $\gamma_{min}$, the pitch control of the wind turbine is modified at 308 by pitching according to the minimum pitch limit $\gamma_{min}$ 304. Hereby the wind turbine control is tuned in comparison to traditional controlling to obtain the same or even an increased annual energy production while reducing the risk of exceeding the acceptable loads on the wind turbine over time which would otherwise lead to a reduced life time.

Figure 8:
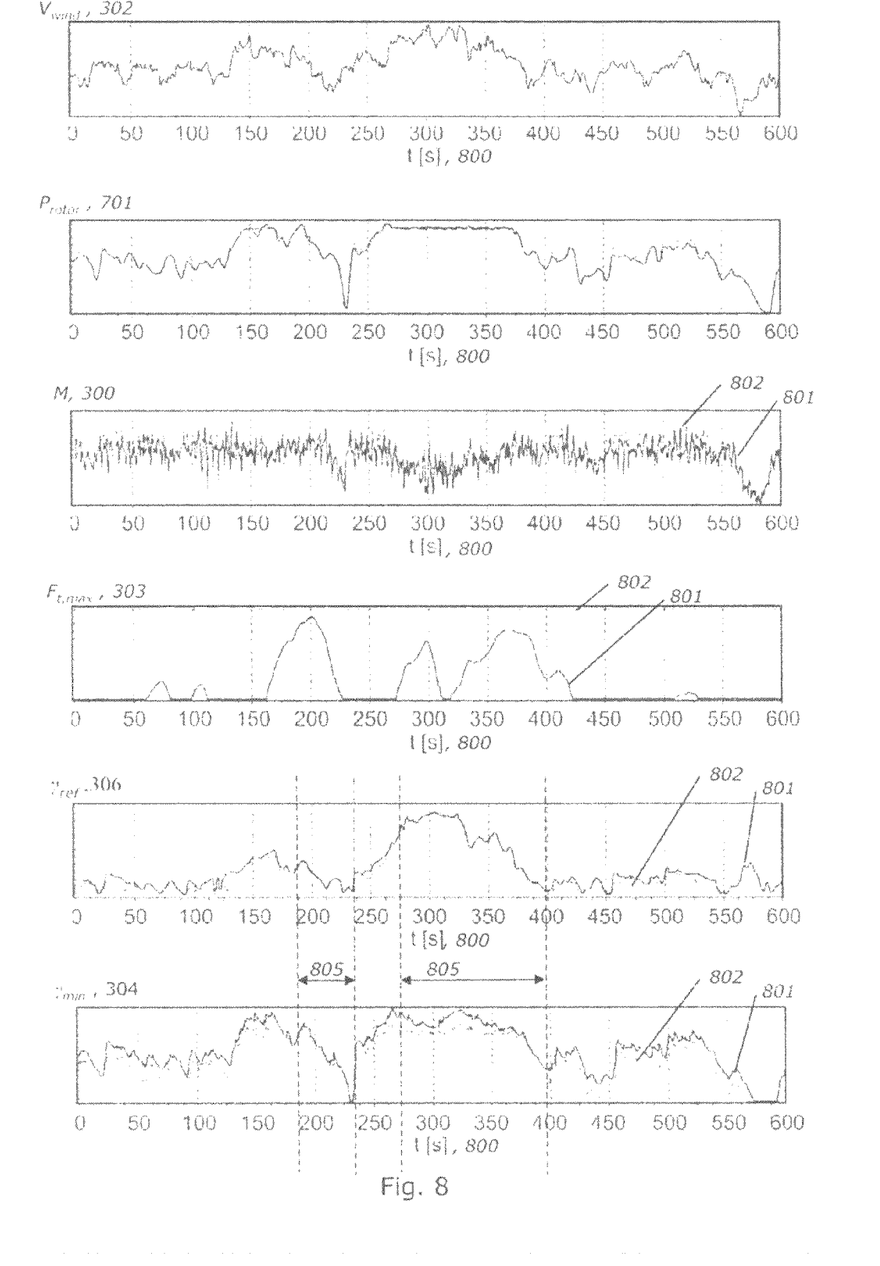
FIGS. 8 and 9 show the wind speed $V_{wind}$, generator power $P_{generator}$, blade moments M, maximum acceptable thrust $F_{t,max}$, resulting pitch reference, and the minimum acceptable pitch angle resulting from a control strategy according to an embodiment of the invention and compared to the results from a conventional control strategy and for two different wind scenario.
Figure 9:
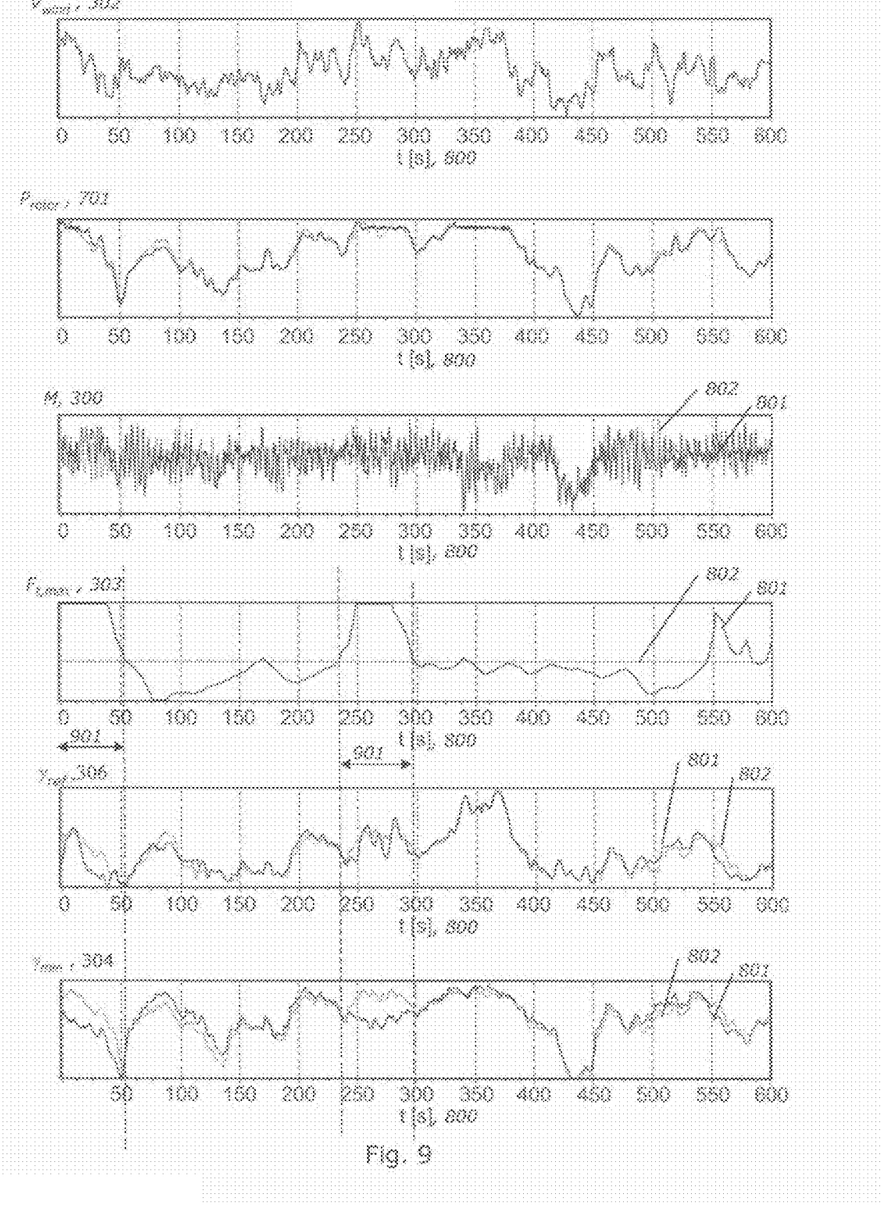

In FIGS. 8 and 9 are shown a time series without and with the control method implemented according to the above and during simulation of two different normal wind scenarios. The wind speed 302 as a function of time t 800 is shown in the first curve; which wind load condition results in the generator power $P_{generator}$, 701, blade moments M, 300, maximum allowable thrust $F_{t,max}$, 303, resulting pitch reference $\gamma_{ref}$, 306, and the minimum acceptable pitch limit $\gamma_{min}$ 304 in the following curves. The solid black lines 801 show the parameters resulting according to the proposed control method of modifying the pitch when large fatigue loads are detected based on variations of the turbine blade loads. The dotted curves 802 show the resulting parameters according to a conventional control method where the pitch reference is only modified in case a predetermined and constant maximum rotor thrust is otherwise exceeded.

As described previously, the proposed control method only actively affects the pitch reference in the situations where the otherwise determined pitch is smaller than the minimum pitch limit determined so that a maximum allowable rotor thrust which is a variable depending on the actual wind and load conditions is not exceeded. It can be seen from FIG. 8 that the proposed control method of modifying the pitch is not active in the periods 805 of approximately 190 s<t<240 s and 270 s<t<400 s as the pitch reference 306 for the two different control methods are here the same. In the wind scenario simulated in FIG. 8, the estimated maximum allowable rotor thrust $F_{t,max}$, 303 according to the proposed control method 801 is at all times t lower than the otherwise applied predetermined and constant maximum allowable rotor thrust 802, meaning that in this example the variations of the sensed turbine loads M, 300 over time in combination with the current wind speed leads to stricter requirements to the acceptable rotor thrust. This therefore correspondingly results in more conservative and higher minimum pitch limits $\gamma_{min}$ 304, 801 and resulting pitch reference values $\gamma_{ref}$ 306, 801 compared to the conventional control method shown by the dotted curves 802.

According to the proposed control method, higher values of the maximum allowable rotor thrust may however equally well be accepted in some situations depending on the wind conditions and the thereby resulting variations in the loading on the wind turbine. This is illustrated in the simulation in FIG. 9 for example in the time periods 901 of 0 s<t<60 s and 235 s<t<295 s. This increase in the maximum allowable rotor thrust then leads to lower minimum pitch limits and thereby a lower resulting pitch reference than would otherwise be used in the situations where the minimum pitch limits are active and the control method is modified.

Figure 10:
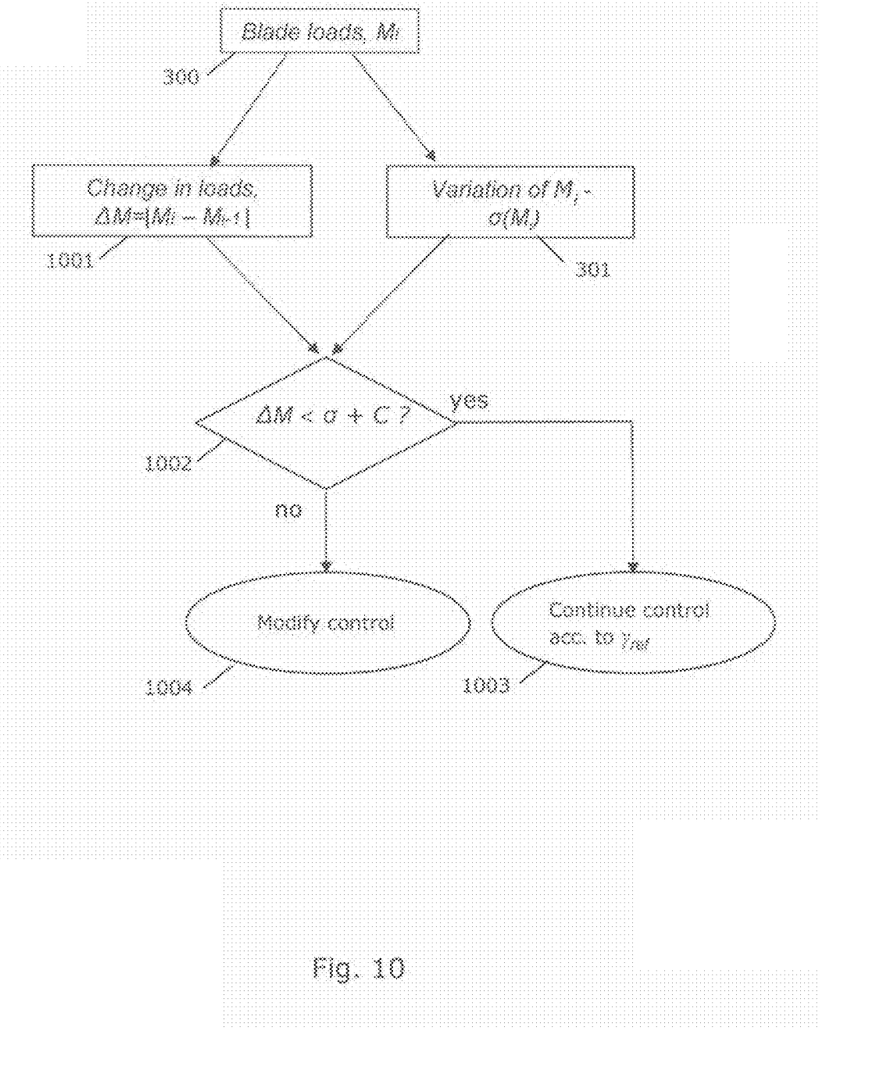
FIG. 10 is a flow-chart illustrating an embodiment of the control method.

FIG. 10 is a flow-chart illustrating an embodiment of the control method according to the invention. In addition to the previously described measuring of one or more operational parameters 300 representing a loading on the wind turbine rotor caused by the impeding wind (e.g. loads on the turbine blades, $M_i$, and/or the angular acceleration of the rotor $\alpha_i$ as measured at the time step i), and the variation parameter hereof $\sigma$, 301 (e.g. the standard deviation or the variance), the change in the operational parameter in two successive time steps $\Delta M = |M_i - M_{i-1}|$ is determined 1001. This immediate change is then compared to the variation parameter, 1002, and the resulting control strategy is based hereon. In case the operational parameter changes more than expected from the variation parameter, this is interpreted as an indication of an impending abrupt or extreme change in the wind conditions, and a safety control strategy is applied, 1004 where precautionary means are taken. The safety control strategy may imply applying a more conservative control of for example increasing the pitch reference value by a certain value, or comprise de-rating the wind turbine. The pitch reference may be increased by a predefined constant or by a value depending on the current level of pitching, such that the pitch as an example may be increased more if the current pitch is low and an increase in the wind therefore will result in a larger increase in the loads on the rotor. Alternatively or additionally the safety control strategy may imply setting the maximum allowable rotor thrust to a certain conservative value. By such fast reaction the wind turbine control may be modified so quickly that any high loads especially on the tower or the turbine blades may be avoided, and that the wind turbine need not be shut down or overloaded, but instead may continue to be in an operating and power producing mode.

The pitch reference is not modified in case the change in operation parameter $\Delta M$ falls within an acceptable limit of the variation parameter, 1003. Thus, the safety control strategy of e.g. de-rating the wind turbine is not triggered during benign operation of the wind turbine, which is advantageous as the power production of the wind turbine is hence not lowered unnecessarily.

The control method in this way may comprise a relatively slowly adaptive algorithm as previously described which relatively slowly adjusts the minimum pitch limit according to the prevailing stationary or near stationary wind conditions, in combination to a fast reacting algorithm which will fast modify the control strategy according to a safety strategy in case the loads and thereby the wind conditions are detected as non stationary.

The control method as described above and as outlined in FIG. 10 may be applied in combination with or completely independent of the control method as previously described in relation to especially FIG. 3 of determining a minimum pitch limit based on an estimated variable maximum allowable rotor thrust.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A method of controlling a wind turbine having a rotor with pitchable wind turbine blades and a generator for producing power, the method comprising:
   determining a pitch reference value for one or more of the pitchable wind turbine blades;
   measuring at time intervals at least one operational parameter representing a loading on the rotor exerted by a wind;
   determining a variation parameter reflecting a variation of the at least one operational parameter over time;
   determining a minimum pitch limit value of the pitch reference value as a function of said variation parameter;
   controlling the wind turbine according to the pitch reference value only if the pitch reference value is greater than or equal to the minimum pitch limit value; and
   controlling the wind turbine according to the minimum pitch limit value if the pitch reference value is less than the minimum pitch limit value.

2. The method of claim 1, wherein the minimum pitch limit value reflects the minimum pitch for maintaining a thrust on the rotor less than or equal to a maximum allowable thrust level.

3. The method of claim 1, further comprising determining a power produced by a rotation of the rotor and a rotational speed of the rotor, and determining the minimum pitch limit value of the pitch reference value as a function of said power and said rotational speed of the rotor.

4. The method of claim 1, further comprising determining a maximum allowable thrust on the rotor as a function of the variation parameter, and determining said minimum pitch limit value of the pitch reference value as a function of said maximum allowable thrust.

5. The method of claim 4, further comprising determining a mean wind speed on the rotor, and determining the maximum allowable thrust as a function of said mean wind speed.

6. The method of claim 3, further comprising determining a maximum allowable thrust from predetermined look-up tables.

7. The method of claim 1, wherein measuring the at least one operational parameter comprises measuring loads on the one or more of the pitchable wind turbine blades.

8. The method of claim 1, wherein measuring the at least one operational parameter comprises measuring a sideways acceleration of the rotor, an axial acceleration of the rotor, and/or an angular acceleration of the rotor.

9. The method of claim 1, wherein measuring the at least one operational parameter comprises measuring a distance between one of the pitchable wind turbine blades and a wind turbine tower, an acceleration of the wind turbine tower or the nacelle, and/or a rotational speed of the generator or the rotor.

10. The method of claim 1, wherein the variation parameter is determined as a standard deviation of the at least one operational parameter.

11. The method of claim 1, wherein the variation parameter is determined by filtering the at least one operational parameter.

12. The method of claim 11, wherein the variation parameter is determined as a function of a difference between a fast and a slow low pass filtered operational parameter.

13. The method of claim 1, further comprising:
   determining a change in the at least one operational parameter as measured in two successive time steps; and
   overruling the preceding control and controlling the wind turbine according to a safety control strategy if a difference between the at least one operational parameter change and said variation parameter is greater than an alert threshold.

14. The method of claim 13, wherein the safety control strategy comprises increasing the minimum pitch limit value.

15. The method of claim 2, wherein the safety control strategy comprises setting the maximum allowable thrust level to a pre-defined value.

16. The method of claim 13, wherein the alert threshold is a predefined constant.

17. A method of controlling a wind turbine having a rotor with pitchable wind turbine blades and a generator for producing power, the method comprising:
   determining a pitch reference value of one or more of the pitchable wind turbine blades;
   measuring at time intervals at least one operational parameter representing a loading on the wind turbine rotor exerted by a wind;
   determining the change in the at least one operational parameter as measured in two successive time steps;
   determining a variation parameter reflecting a variation of the at least one operational parameter over time;
   controlling the wind turbine according to the pitch reference value only if the difference between the at least one operational parameter change and said variation parameter is less than or equal to an alert threshold; and
   controlling the wind turbine according to a safety control strategy if a difference between the at least one operational parameter change and said variation parameter is greater than the alert threshold.

18. The method of claim 17, wherein the safety control strategy comprises increasing the pitch reference value.

19. The method of claim 17, wherein the safety control strategy comprises de-rating the wind turbine.

20. A method of controlling a wind turbine having a rotor with pitchable wind turbine blades and a generator for producing power, the method comprising:
   determining a pitch reference value for one or more of the pitchable wind turbine blades;
   measuring at time intervals at least one operational parameter representing a loading on the rotor exerted by a wind;
   determining a change in the at least one operational parameter as measured in two successive time steps;
   determining a variation parameter reflecting a variation of the at least one operational parameter over time;
   determining a minimum pitch limit value of the pitch reference value as a function of said variation parameter;
   controlling the wind turbine according to a safety control strategy if a difference between the at least one operational parameter change and said variation parameter is greater than or equal to an alert threshold;
   controlling the wind turbine according to the pitch reference value only if the difference between the at least one operational parameter change and said variation parameter is less than the alert threshold and the pitch reference value is greater than or equal to the minimum pitch limit value; and
   controlling the wind turbine according to the minimum pitch limit value if the difference between the at least one operational parameter change and said variation parameter is less than the alert threshold and the pitch reference value is less than the minimum pitch limit value.

21. A control system for a wind turbine configured to perform the steps of:
   determining a pitch reference value for one or more of the wind turbine blades;
   determining at least one operational parameter measured at time intervals and representing a loading on a wind turbine rotor exerted by a wind;
   determining a variation parameter reflecting a variation of the at least one operational parameter over time;
   determining a minimum pitch limit value of the pitch reference value as a function of said variation parameter;
   controlling the wind turbine according to the pitch reference value only if the pitch reference value is greater than or equal to the minimum pitch limit value; and
   controlling the wind turbine according to the minimum pitch limit value if the pitch reference value is less than the minimum pitch limit value.

22. A wind turbine, comprising:
   a rotor with pitchable wind turbine blades;
   a generator for producing power;
   a measuring unit placed in relation to the rotor and configured to measure at time intervals at least one operational parameter representing a loading on the rotor exerted by the wind; and
   a control system according to claim 21, comprising:
      a pitch controller for determining a pitch reference value for one or more of the wind turbine blades, and
      a processor for determining the at least one operational parameter as measured by the measuring unit, and for determining a variation parameter reflecting a variation of the at least one operational parameter over time, and for determining a minimum pitch limit value of the pitch reference value as a function of said variation parameter, wherein the pitch controller is further configured for controlling the wind turbine according to the pitch reference value only if the pitch reference value is greater than or equal to the minimum pitch limit value, and the pitch controller is further configured to control the wind turbine according to the minimum pitch limit value if the pitch reference value is less than the minimum pitch limit value.

* * * * *